US009575687B2

(12) United States Patent
Desai

(10) Patent No.: US 9,575,687 B2
(45) Date of Patent: Feb. 21, 2017

(54) HOST-BASED REPLICATION WITH END-TO-END COMPRESSION

(71) Applicant: VMware, Inc., Palo Alto, CA (US)

(72) Inventor: Asit Desai, San Ramon, CA (US)

(73) Assignee: VMware, Inc., Palo Alto, CA (US)

( * ) Notice: Subject to any disclaimer, the term of this patent is extended or adjusted under 35 U.S.C. 154(b) by 135 days.

(21) Appl. No.: 14/609,054

(22) Filed: Jan. 29, 2015

(65) Prior Publication Data

US 2016/0224249 A1 Aug. 4, 2016

(51) Int. Cl.
G06F 13/12 (2006.01)
G06F 3/06 (2006.01)

(52) U.S. Cl.
CPC ............. G06F 3/065 (2013.01); G06F 3/061 (2013.01); G06F 3/064 (2013.01); G06F 3/0643 (2013.01); G06F 3/0664 (2013.01); G06F 3/0667 (2013.01); G06F 3/0673 (2013.01)

(58) Field of Classification Search
None
See application file for complete search history.

(56) References Cited

U.S. PATENT DOCUMENTS

2008/0244577 A1* 10/2008 Le ........................ G06F 8/63 718/1
2009/0031128 A1* 1/2009 French ................ G06F 21/6218 713/164
2010/0011178 A1* 1/2010 Feathergill .......... G06F 11/1466 711/162
2010/0057750 A1* 3/2010 Aasted ............. G06F 17/30067 707/E17.032
2011/0099344 A1* 4/2011 Browne ............... G06F 11/2066 711/162

OTHER PUBLICATIONS

Werneburg, Ken, "Introduction to VMware vSphere Replication", VMware, Inc., Downloaded from http://www.vmware.com/files/pdf/techpaper/Introduction-to-vSphere-Replication.pdf on Jan. 29, 2015, pp. 1-10, Palo Alto, California.
"Hypervisor-based Replication a New Approach to Business Continuity/Disaster Recovery", Zerto White Paper, Jun. 2011, pp. 1-5, Boston.

* cited by examiner

Primary Examiner — Duc Doan

(57) ABSTRACT

Techniques for enabling end-to-end compression when performing host-based replication (HBR) are provided. In one set of embodiments, a hypervisor running on a host system at a primary site can intercept I/O write requests that originate from a virtual machine (VM) configured to be replicated via HBR, the I/O write requests being destined for a virtual disk (VMDK) of the VM. The hypervisor can further track VMDK file blocks that are modified by the I/O write requests and can retrieve the VMDK file blocks from a storage tier at the primary site. The hypervisor can then compress the retrieved VMDK file blocks and transmit the compressed blocks to a secondary site.

18 Claims, 9 Drawing Sheets

HOST-BASED REPLICATION WITH END-TO-END COMPRESSION

BACKGROUND

Host-based replication, or "HBR," is a technology that enables the efficient copying of virtual machine (VM) data from, e.g., a computing deployment at a first site (referred to as the "primary site") to another computing deployment at a second site (referred to as the "secondary site"). When a VM is replicated using HBR, the VM can be quickly restored from its replica copy at the secondary site in the case of an event (either planned or unplanned) that causes the original VM instance at the primary site to become unavailable.

FIG. 1 depicts a diagram illustrating a conventional HBR workflow 100. In this example, the VM being replicated (i.e., VM 102) runs on a host system 104 via a hypervisor 106 at a primary site 108, and the persistent data for VM 102 is stored in a virtual disk file (VMDK) 110 maintained in a storage tier 112 at site 108. The replication target for VM 102 is another VMDK 114 maintained in a storage tier 116 at a secondary site 118. Secondary site 118 is connected to primary site 102 via a wide-area network (WAN) 120.

At steps (1) and (2) of workflow 100 (reference numerals 150 and 152), during runtime of VM 102, a HBR filter 122 executing within hypervisor 106 intercepts, from VM 102, I/O writes destined for VMDK 110 and keeps track of the unique file blocks that are modified by the writes. HBR filter 122 performs this tracking for a period of time that is configured for VM 102, referred to as the VM's recovery point objective (RPO).

At steps (3) and (4) (reference numerals 154 and 156), once the time interval corresponding to the RPO is close to being passed, HBR filter 122 retrieves all of the modified file blocks from VMDK 110 and transmits the blocks, over WAN 120, to a HBR server 124 running on top of a hypervisor 126 of a host system 128 at secondary site 118. Upon receiving the modified file blocks, HBR server 124 identifies another host system at secondary site 118 (i.e., host system 130) that is capable of writing the file data to storage (step (5), reference numeral 158). HBR server 124 then copies, via network file copy (NFC), the modified file blocks to a NFC server 132 running within a hypervisor 134 of identified host system 130 (step (6), reference numeral 160).

Finally, at step (7) (reference numeral 162), NFC server 132 receives the modified file blocks from HBR server 124 and commits the blocks to VMDK 114 on storage tier 116, thereby bringing this replica copy up-to-date with original VMDK 110 at primary site 108. It should be noted that while steps (5)-(7) are occurring at secondary site 118, HBR filter 122 will begin executing steps (1)-(4) again for the next RPO time period, and the entire workflow will repeat. In this way, changes to VDMK 110 will be tracked and replicated to secondary site 118 on an ongoing basis.

While the conventional HBR workflow of FIG. 1 is functional, one inefficiency is that the workflow does not compress any of the data sent over the wire between primary site 108 and secondary site 118. This lack of compression is suboptimal since the majority of data transferred via HBR (i.e., VMDK updates) is highly compressible. It is possible to implement dedicated network devices, such as WAN accelerators, between sites 108 and 118 that are configured to compress disk data at the point it leaves primary site 108 and then decompress the data before being received at secondary site 118. However, there are several scenarios where the use of such WAN accelerators may not be possible or desirable.

For example, if primary site 108 and secondary site 118 are part of the same local area network (e.g., located within the same building or campus), typical WAN accelerators cannot be used because there is no WAN separating the sites. As another example, if the organization managing sites 108 and 118 is cost-sensitive (or needs to manage a large number of such sites), the organization may not want to incur the operational and maintenance costs associated with WAN accelerators or other similar network devices. As yet another example, if primary site 108 and secondary site 118 are managed by two different organizations, it may be difficult to ensure that the WAN accelerator operating at the egress point of the primary site (and compressing outgoing data) is compatible with the WAN accelerator operating at the ingress point of the secondary site (and decompressing incoming data). For instance, if the two WAN accelerators are sourced from different vendors, they may be configured to perform their respective compression and decompression routines using incompatible algorithms.

DETAILED DESCRIPTION

Figure 1:
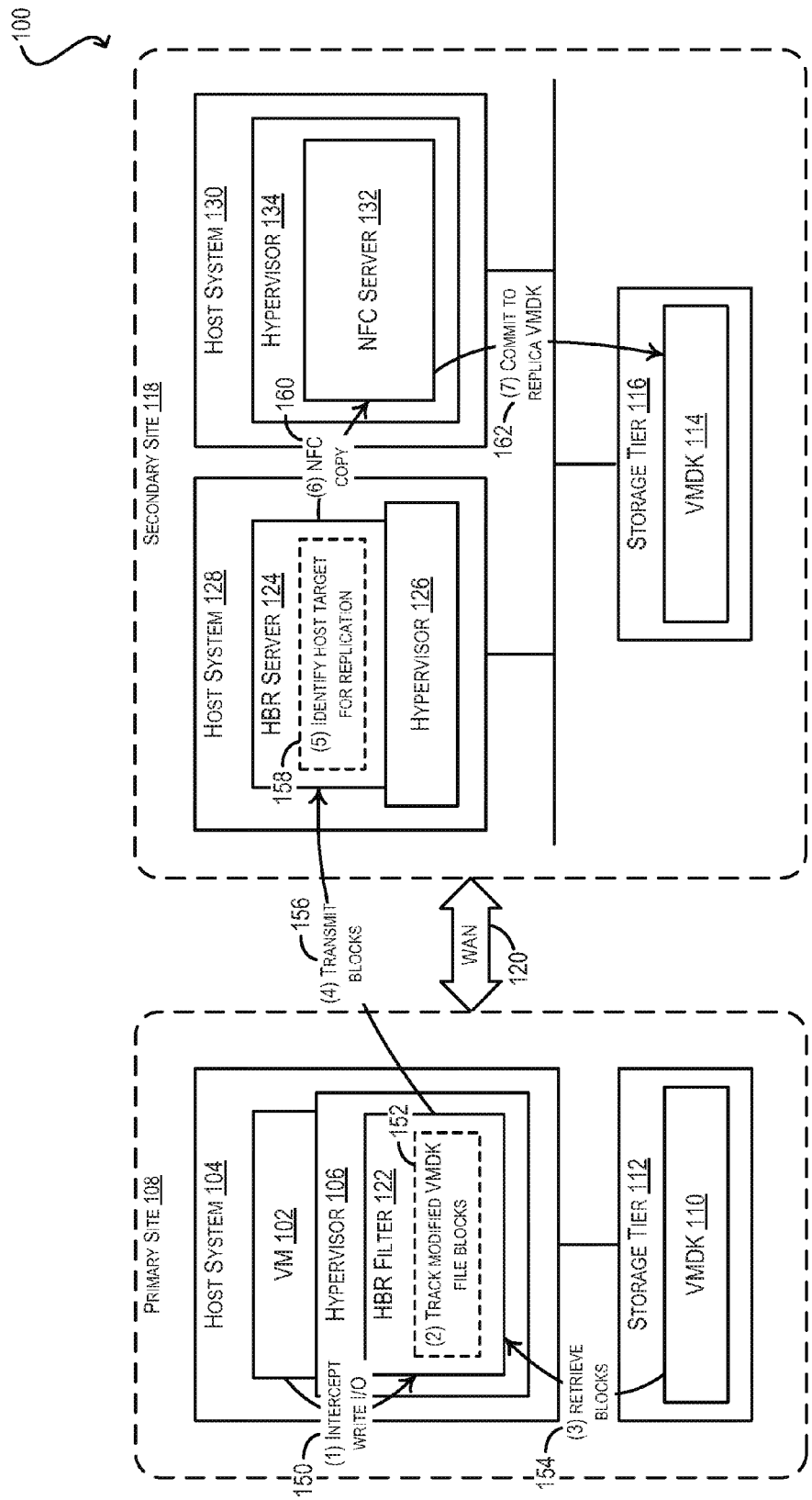
FIG. 1 depicts a conventional HBR workflow.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for achieving end-to-end compression of data that is transferred from a primary site to a secondary site via host-based replication (HBR). In one set of embodiments, a hypervisor running on a first host system at the primary site can intercept I/O write requests that originate from a VM configured for HBR and that are destined for a virtual disk file (VMDK) of the VM. The hypervisor can track (via, e.g., a HBR filter) VMDK file blocks that are modified by the intercepted write requests. The hypervisor can then compress (via, e.g., a compressor module in the HBR filter) the VMDK file blocks and transmit the compressed VMDK file blocks to a secondary site.

Upon receiving the compressed VMDK file blocks, a HBR server running on a second host system at the secondary site can identify a third host system at the secondary site that is capable of persisting the received data to a replica copy of the VMDK. The HBR server can then forward (via, e.g., network file copy (NFC)) the compressed VMDK file blocks to a hypervisor running on the third host system. The hypervisor of the third host system can receive (via, e.g., a NFC server) the compressed VMDK file blocks and can expand (via, e.g., a decompressor module in the NFC server) the blocks to their decompressed form. Finally, the hypervisor of the third host system can write the decompressed VMDK file blocks to the replica copy of the VMDK located at the secondary site.

With the techniques described above, the VMDK data replicated from the primary site to the secondary site can be compressed, and remain in compressed form, throughout the transmission path from the first host system at the primary site (executing the HBR filter) to the third host system at the secondary site (executing the NFC server). This advantageously reduces the network load on all of the links along that path, including the link between the first host system and the second host system (which may be, e.g., a WAN link) and the link between the second host system and the third host system (which may be, e.g., a LAN link). This is made possible by the fact that the compression and decompression routines are performed within the hypervisors of the two host systems located at the endpoints of the HBR workflow (i.e., the first and third host systems), rather than by intermediary devices/systems (e.g., WAN accelerators). The techniques described herein can also advantageously reduce the amount of buffer space needed by the HBR server on the second host system for receiving and forwarding VMDK data, since the HBR server deals solely with fully compressed data.

In some embodiments, beyond performing the compression and decompression noted above, the HBR filter of the first host system and NFC server of the third host system can also implement novel logic for more intelligently handling replication in scenarios where the hypervisors of the respective host systems are configured to maintain VMDK data in certain special formats "on disk" (i.e., on the storage tier). For example, if the hypervisors support VMDK compression on disk (meaning that VMDK data is stored in compressed format on the storage tier), the HBR filter and the NFC server can implement logic for short-circuiting the compression/decompression steps described above (since the data of the original VMDK is already compressed in the storage tier at the primary site, and thus can be transferred "as is" to the storage tier at the secondary site).

As another example, if the hypervisors support VMDK de-duplication on disk (meaning that identical data blocks within a VMDK or across multiple VMDKs are stored only once on the storage tier), the HBR filter can implement logic for tracking which de-duplicated blocks are sent over to the secondary site from the primary site during the replication process. The HBR filter can then use this information to avoid sending de-duplicated blocks multiple times over the wire (instead, the HBR filter can simply send over hash values for those blocks), thereby reducing network bandwidth consumption.

These and other aspects of the present disclosure are described in further detail in the sections that follow.

2. System Environment

Figure 2:
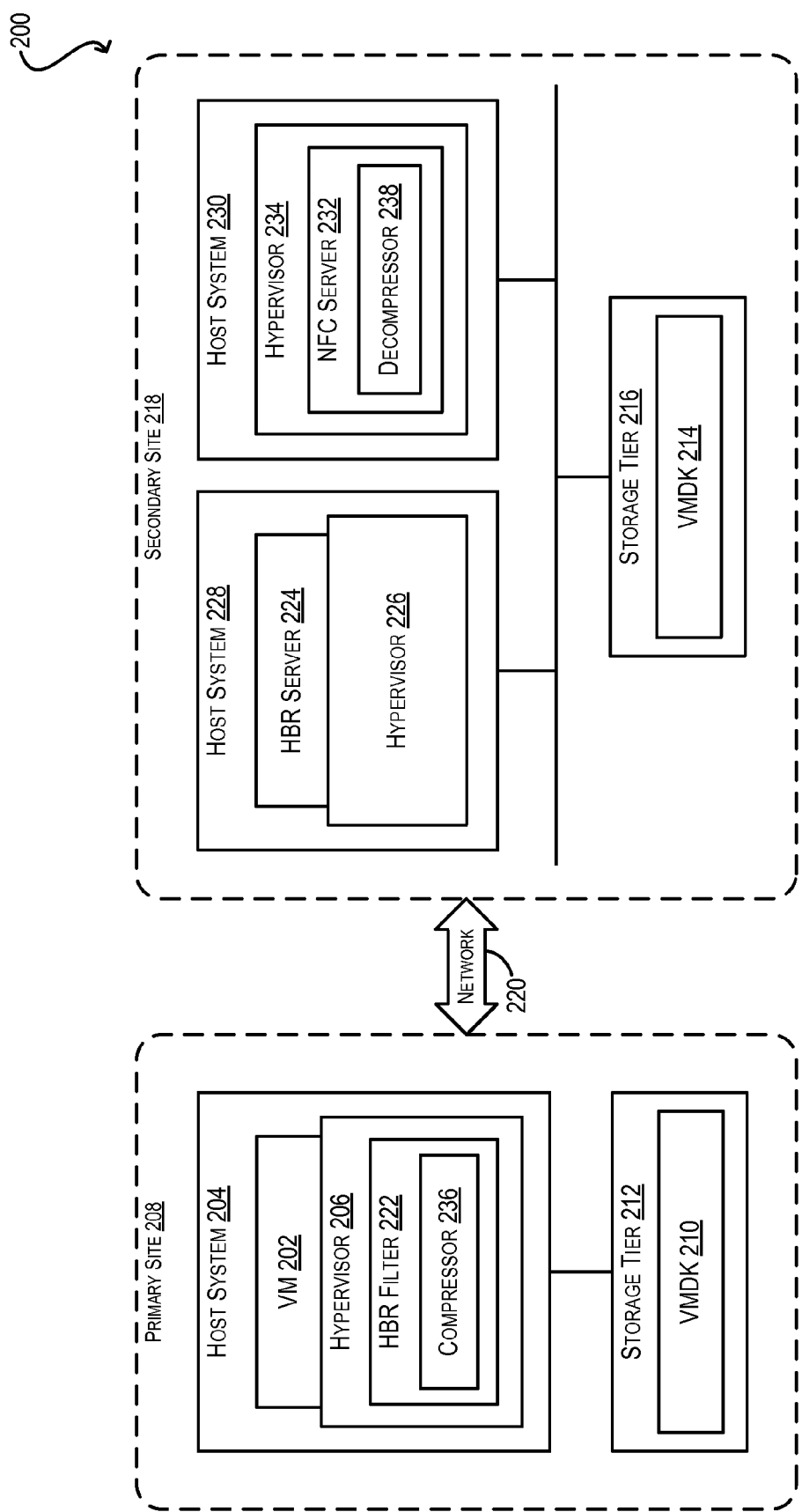
FIG. 2 depicts a system environment that supports HBR with end-to-end compression according to an embodiment.

FIG. 2 depicts a system environment 200 that supports HBR with end-to-end compression according to an embodiment. System environment 200 includes certain components that are similar to the environment shown in FIG. 1. For example, system environment 200 includes a primary site 208 and a secondary site 218 that are connected via a network 220. In one embodiment, network 220 can be a WAN. In other embodiments, network 220 can be a LAN, a metro area network (MAN), or any combination of these or other networks.

Primary site 208 comprises a host system 204 running a hypervisor 206, which in turn provides an execution environment for a VM 202. Although only a single VM is depicted, any number of such VMs can be supported. Hypervisor 206 also includes a HBR filter 222 as part of its I/O stack. HBR filter 222 provides functions for replicating, via HBR, the persistent data of VM 202 (stored as VMDK 210 in a storage tier 212) from primary site 208 to secondary site 218. In one embodiment, HBR filter 222 can be implemented using the vSphere Replication technology in VMware Inc.'s ESX Hypervisor product.

Secondary site 218 comprises two host systems 228 and 230, each executing a hypervisor 226 and 234. Hypervisor 226 of host system 228 runs (as, e.g., a VM) a HBR server 224, which provides functions for propagating the VMDK data sent by HBR filter 222 at primary site 208 to a storage tier 216 at secondary site 218. For instance, in a particular embodiment, HBR server 224 can receive modified file blocks for VMDK 210 sent by HBR filter 222 and can forward the data to a NFC server 232 within hypervisor 234 of host system 230. NFC server 232 can then receive the VMDK data from HBR server 224 and can commit the modified file blocks to a replica copy of VMDK 210 (i.e., VMDK 214) in storage tier 216. Like HBR filter 222, in one embodiment, HBR server 224 and NFC server 232 can be implemented using the vSphere Replication technology in VMware Inc.'s ESX Hypervisor product.

As discussed in the Background section, one inefficiency with performing replication using a conventional HBR workflow is that the data transmitted from the primary site to the secondary site is sent in uncompressed form over the wire. This unnecessarily increases the amount of network bandwidth required between the endpoints of the transmission path (e.g., host system 204 and host system 230 in FIG. 2). This also increases the amount of memory needed by HBR server 224 for buffering data between those two endpoints.

To address these and other similar issues, HBR filter 222 and NFC server 232 of FIG. 2 include a compressor module 236 and decompressor module 238 respectively. As detailed in the next section, HBR filter 222 and NFC server 232 can leverage these modules to compress and decompress replicated VMDK data at the hypervisor level of host systems 204 and 230 as part of the HBR workflow. In this way, the VMDK data can be transferred in compressed form throughout the end-to-end HBR transmission path.

It should be appreciated that system environment 200 of FIG. 2 is illustrative and not intended to limit the embodiments disclosed herein. For example, although HBR server 224 and NFC server 232 are shown as running on two separate host systems at secondary site 218, in other embodiments the functions of these two components may integrated into a single host system. Further, in some embodiments, decompressor module 238 may be included in HBR server 224 in addition to (or in lieu of) being included in NFC server 232. In these embodiments, the decompression step can be performed by HBR server 224. Yet further, the various entities of system environment 200 may be arranged according to other configurations and/or may include subcomponents or functions that have not been specifically described. One of ordinary skill in the art will recognize many variations, modifications, and alternatives.

3. HBR Workflow with End-to-End Compression

Figure 3:
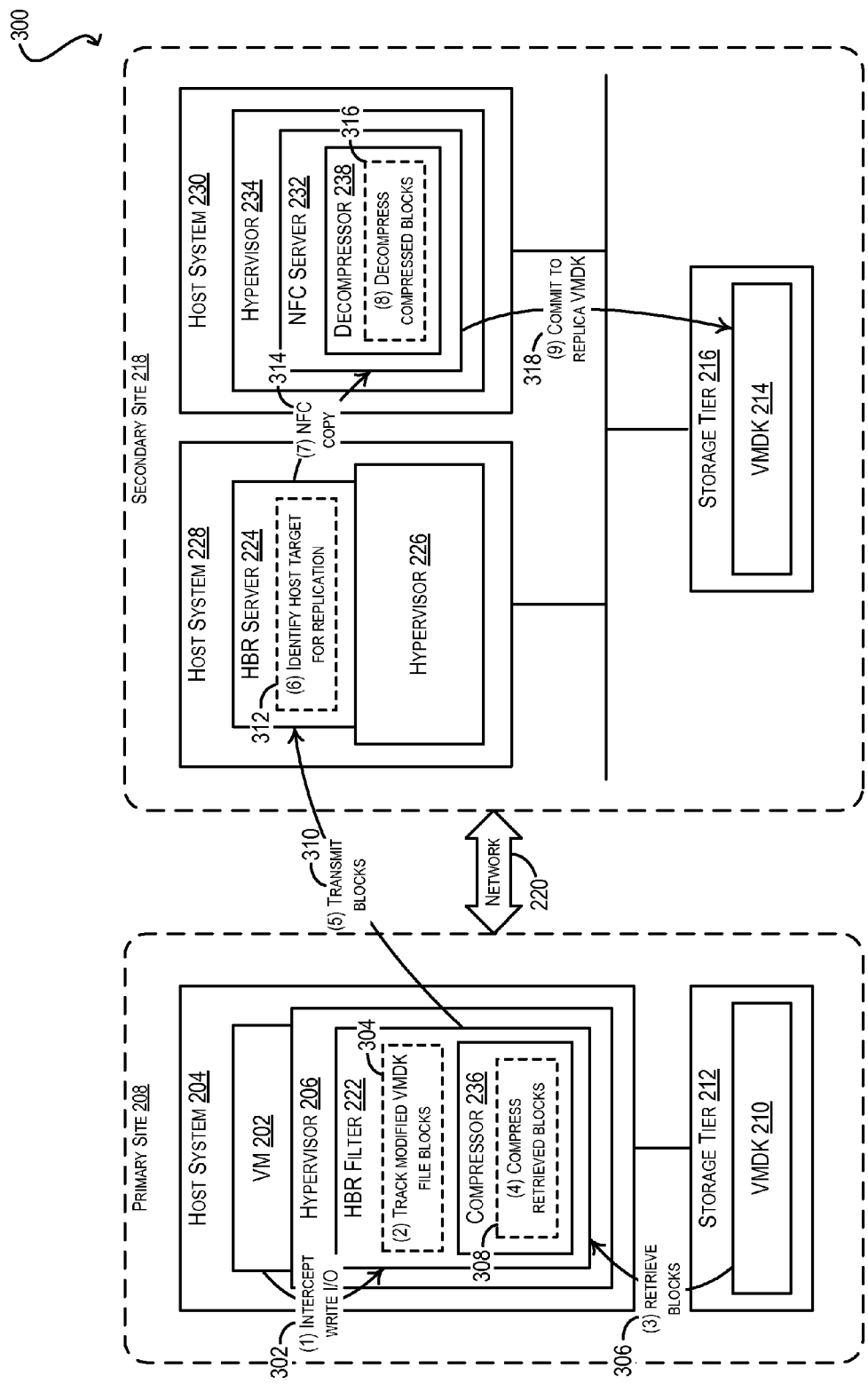
FIG. 3 depicts a HBR workflow within the system environment of FIG. 2 according to an embodiment.

FIG. 3 depicts a workflow 300 that may be executed in the context of system environment 200 of FIG. 2 for replicating the persistent state of VM 202 (i.e., VMDK 210) from primary site 208 to a replica copy (i.e., VMDK 214) at secondary site 218 using end-to-end compression according to an embodiment. Workflow 300 assumes that that an initial synchronization has taken place between VMDK 214 and VMDK 210, such that both virtual disks share a baseline state. Alternatively, VMDK 214 can be seeded with a baseline copy of VMDK 210.

At steps (1) and (2) (reference numerals 302 and 304), HBR filter 222 of hypervisor 206 can intercept, from VM 202, I/O writes destined for VMDK 210 and can keep track of the unique file blocks that are modified by the writes. In a particular embodiment, HBR filter 222 can perform this tracking by updating a bitmap of dirty blocks associated with VMDK 210. As discussed with respect to conventional workflow 100, HBR filter 222 can carry out steps (1) and (2) for a period of time configured for VM 202, referred to as the VM's RPO.

At step (3) (reference numeral 306), once the current RPO time interval is close to being passed, HBR filter 222 can retrieve, from storage tier 212, all of the file blocks of VMDK 210 that have been modified over the interval (as identified by, e.g., HBR filter 222's bitmap). Then, at step (4) (reference numeral 308), HBR filter 222 can use compressor module 236 to compress the modified file blocks. This step, which does not occur in conventional workflow 100 of FIG. 1, ensures that the VMDK data is sent in compressed form to secondary site 218.

Once the modified file blocks have been compressed, HBR filter 222 can transmit the compressed file blocks over network 220 to HBR server 224 at secondary site 218 (step (5), reference numeral 310).

In response to receiving the compressed file blocks, HBR server 224 can identify host system 230 as being capable of writing the data to storage tier 216 and can copy, via NFC, the compressed file blocks to NFC server 232 (steps (6) and (7), reference numerals 312 and 314). Upon receiving these blocks from HBR server 224, NFC server 232 can use decompressor module 238 to decompress the compressed blocks (step (8), reference numeral 316). In this manner, NFC server 232 can recover the original VMDK data compressed via compressor module 236. As discussed with respect to FIG. 2, in some embodiments this decompression step may actually be performed by HBR server 224 rather than NFC server 232 (if, e.g., NFC server 232 does not support decompression). In these embodiments, HBR server 224 can copy decompressed, instead of compressed, data via NFC to NFC server 232.

Finally, at step (9) (reference numeral 318), NFC server 232 can commit the decompressed file blocks to VMDK 214 on storage tier 216, thereby brining this replica copy up-to-date with original VMDK 210 at primary site 208.

Although not specifically shown, while steps (6)-(9) are occurring at secondary site 218, HBR filter 222 can begin executing steps (1)-(5) again for the next RPO time period, and the entire workflow can repeat. In this way, changes to VDMK 210 can be tracked and replicated to secondary site 218 on an ongoing basis.

With workflow 300 of FIG. 3, the modified file blocks for VMDK 210 remain in compressed form throughout the transmission path from host system 204 (which retrieves the file blocks from storage tier 212) to host system 230 (which writes the file blocks to storage tier 216). Thus, the amount of network bandwidth consumed using this approach can be significantly less than the conventional HBR workflow of FIG. 1. Further, since the compression and decompression is performed at the hypervisor level of host systems 204 and 230, there is no need for intermediary devices/systems such as WAN accelerators to facilitate these functions.

4. Other Enhancements

As mentioned previously, in addition to enabling end-to-end compression when performing HBR, in some embodiments HBR filter 222 and NFC server 232 can also be enhanced to more intelligently handle replication in scenarios where VMDK data is maintained in certain special formats on disk (e.g., compressed on disk, encrypted on disk, de-duplicated on disk, etc.). Generally speaking, these enhancements allow HBR filter 222 and NFC server 232 to reduce the amount of work they need to perform during the replication process (and/or reduce the bandwidth requirements of the process) in these specific scenarios.

Figure 4A:
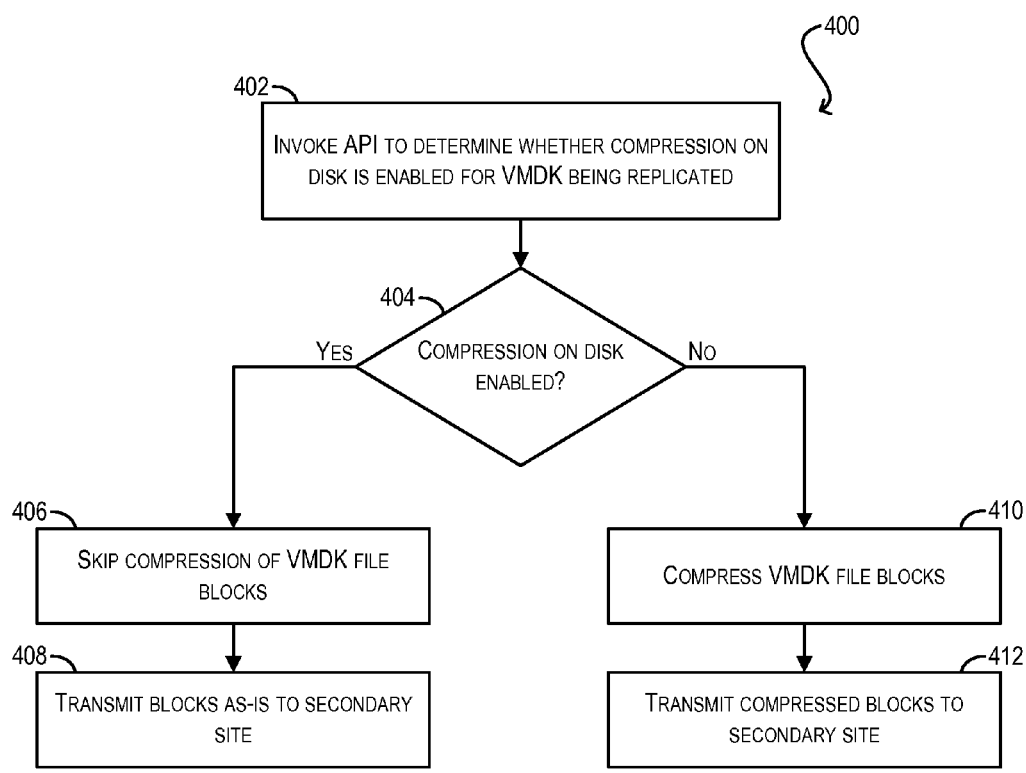
FIGS. 4A and 4B depict flowcharts for more intelligently handling HBR when VMDK data may be compressed on disk according to an embodiment.
Figure 4B:
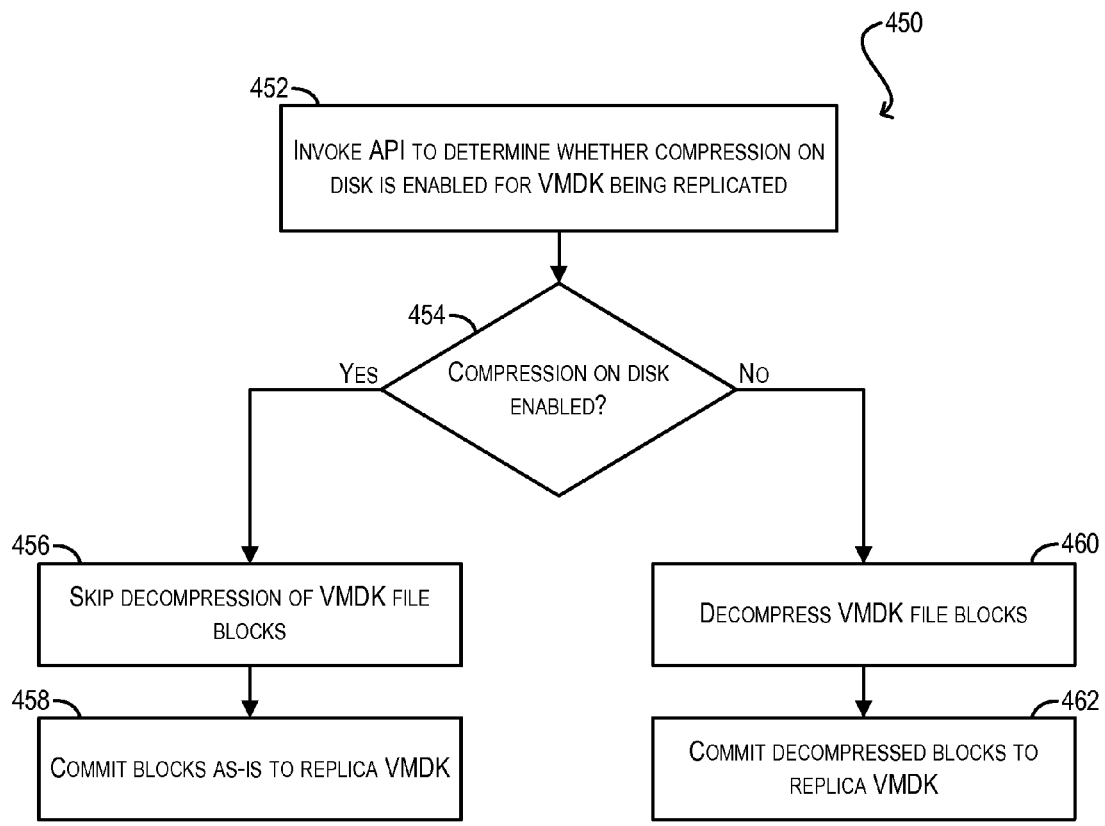

For example, FIGS. 4A and 4B illustrate flowcharts 400 and 450 that can be performed by HBR filter 222 and NFC server 232 respectively for more intelligently handling replication when the VMDK of the VM being replicated (e.g., VMDK 210) may be compressed on disk. Flowchart 400 can be performed by HBR filter 222 prior to step (4) of workflow 300, while flowchart 450 can be performed by NFC server 232 prior to step (8) of workflow 300.

Starting with step 402 of flowchart 400, HBR filter 222 can invoke an API to determine whether compression on disk is enabled for VMDK 210. In a particular embodiment, this API can be exposed by a component of hypervisor 206.

If HBR filter 222 determines that VMDK 210 is compressed on disk, HBR filter 222 can avoid compressing the modified file blocks retrieved from VMDK 210 (in other words, skip step (4) of workflow 300) and can transmit the file blocks "as is" to secondary site 218 (steps 404, 406, 408). This is because the file blocks are already compressed on storage tier 212, and thus there is no need to compress them again for transmission purposes.

On the other hand, if HBR filter 222 determines that VMDK 210 is not compressed on disk, HBR filter 222 can compress the file blocks and then send the compressed blocks over the wire, per step (4) of workflow 300 (steps 404, 410, 412).

Turning now to flowchart 450 of FIG. 4B, at step 452, NFC server 232 can invoke an API to determine whether compression on disk is enabled for VMDK 210 (or its replica copy VMDK 214). In a particular embodiment, this API can be exposed by a component of hypervisor 234.

If NFC server 232 determines that VMDK 210 (or VMDK 214) is compressed on disk, NFC server 232 can avoid decompressing the file blocks received from HBR server 224 (in other words, skip step (8) of workflow 300) and can commit the file blocks "as is" to VMDK 214 (steps 454, 456, 458). This is because the file blocks should be stored in compressed form on storage tier 216, and thus they should not be decompressed prior to being written to disk.

On the other hand, if NFC server 232 determines that VMDK 210 (or VMDK 214) is not compressed on disk, NFC server 232 can decompress the file blocks prior to committing them to VMDK 214, per step (8) of workflow 300 (steps 454, 460, 462).

Figure 5A:
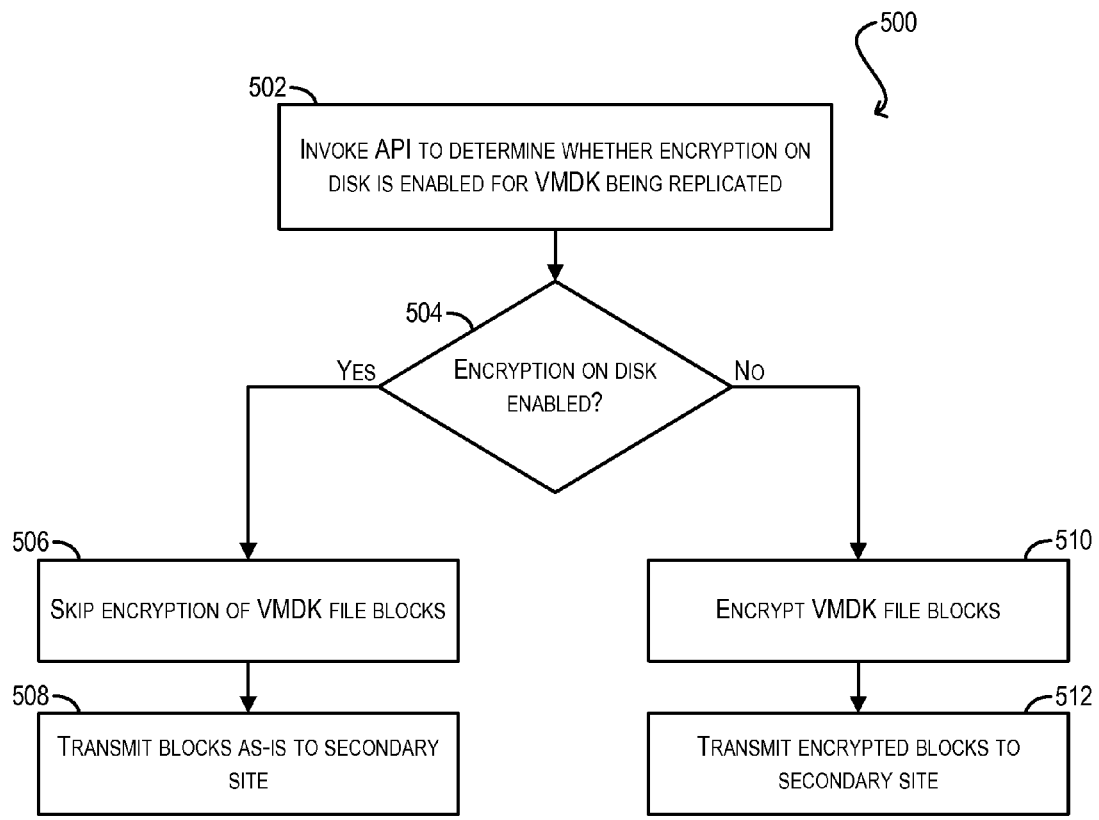
FIGS. 5A and 5B depict flowcharts for more intelligently handling HBR when VMDK data may be encrypted on disk according to an embodiment.
Figure 5B:
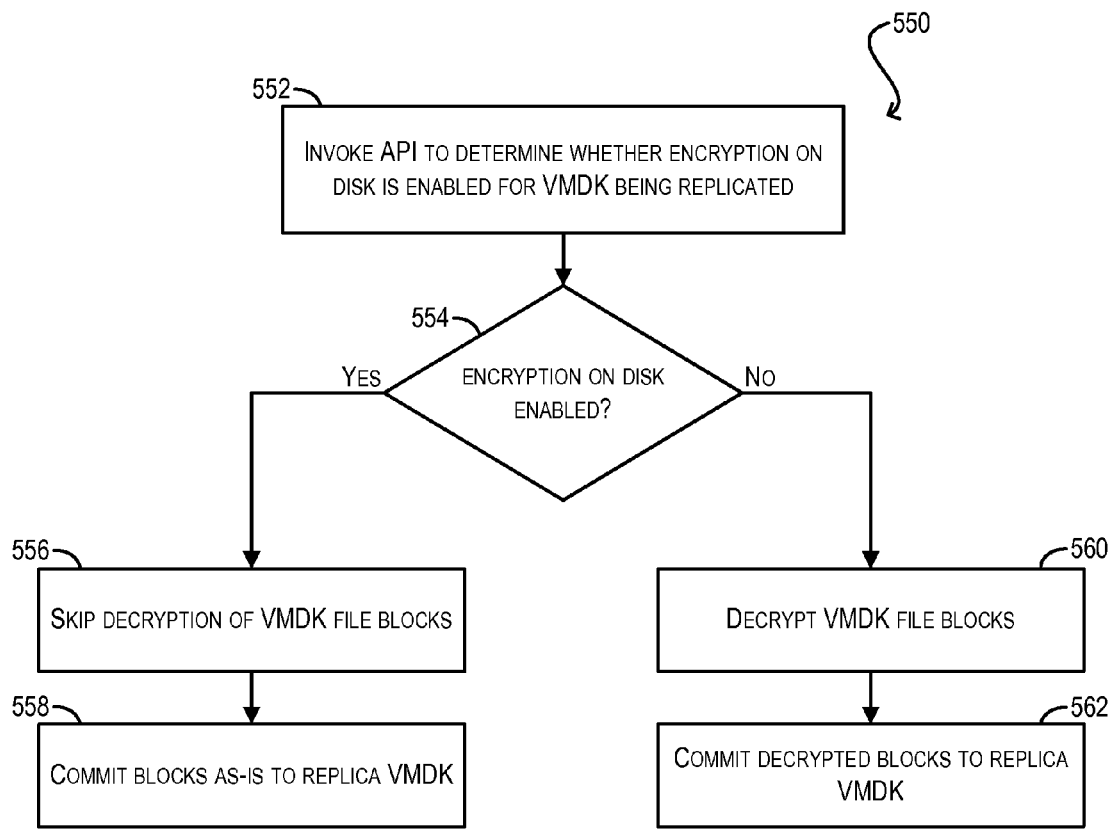

FIGS. 5A and 5B illustrate flowcharts 500 and 550 that can be performed by HBR filter 222 and NFC server 232 respectively for more intelligently handling replication when the VMDK of the VM being replicated (e.g., VMDK 210) may be encrypted on disk. In scenarios where encryption on disk is not supported and HBR is performed over an unsecure connection between sites, it is possible for HBR filter 222 to encrypt the modified file blocks that are sent over the wire (in order to ensure that the data cannot be tampered with). Similarly, it is possible for NFC server 232 to decrypt the file blocks prior to writing the blocks to replica VMDK 214 at secondary site 218. However, with flowcharts 500 and 550, HBR filter 222 and NFC server 232 can avoid these encryption/decryption routines if the VMDK data is already stored in encrypted form on disk.

Starting with step 502 of flowchart 500, HBR filter 222 can invoke an API to determine whether encryption on disk is enabled for VMDK 210. In a particular embodiment, this API can be exposed by a component of hypervisor 206.

If HBR filter 222 determines that VMDK 210 is encrypted on disk, HBR filter 222 can avoid encrypting the modified file blocks retrieved from VMDK 210 and can transmit the file blocks "as is" to secondary site 218 (steps 504, 506, 508). This is because the file blocks are already encrypted on storage tier 212, and thus there is no need to encrypt them again for transmission purposes.

On the other hand, if HBR filter 222 determines that VMDK 210 is not encrypted on disk, HBR filter 222 can encrypt the file blocks prior to sending them over the wire to secondary site 218 (steps 504, 510, 512). In some embodiments, HBR filter 222 may be configured to compress the file blocks (per workflow 300 of FIG. 3) in addition to encrypting the blocks before transmission. Generally speaking, if the data is encrypted before it is compressed, the data will not compress well because a strong encryption algorithm will randomize the data to the extent that compression algorithms will not find any common patterns. Thus, in these embodiments, HBR filter 222 can compress the file blocks prior to performing the encryption at step 510.

Turning now to flowchart 550 of FIG. 5B, at step 552, NFC filter 232 can invoke an API to determine whether encryption on disk is enabled for VMDK 210 (or its replica copy VMDK 214). In a particular embodiment, this API can be exposed by a component of hypervisor 234.

If NFC server 232 determines that VMDK 210 (or VMDK 214) is encrypted on disk, NFC server 232 can avoid decrypting the file blocks received from HBR server 224 and can commit the file blocks "as is" to VMDK 214 (steps 554, 556, 558). This is because the file blocks should be stored in encrypted form on storage tier 216, and thus they should not be decrypted prior to being written to disk.

On the other hand, if NFC server 232 determines that VMDK 210 (or VMDK 214) is not encrypted on disk, NFC server 232 can decrypt the file blocks (since they were previously encrypted by HBR filter 222) and then commit the decrypted data to VMDK 214 (steps 554, 560, 562).

Figure 6A:
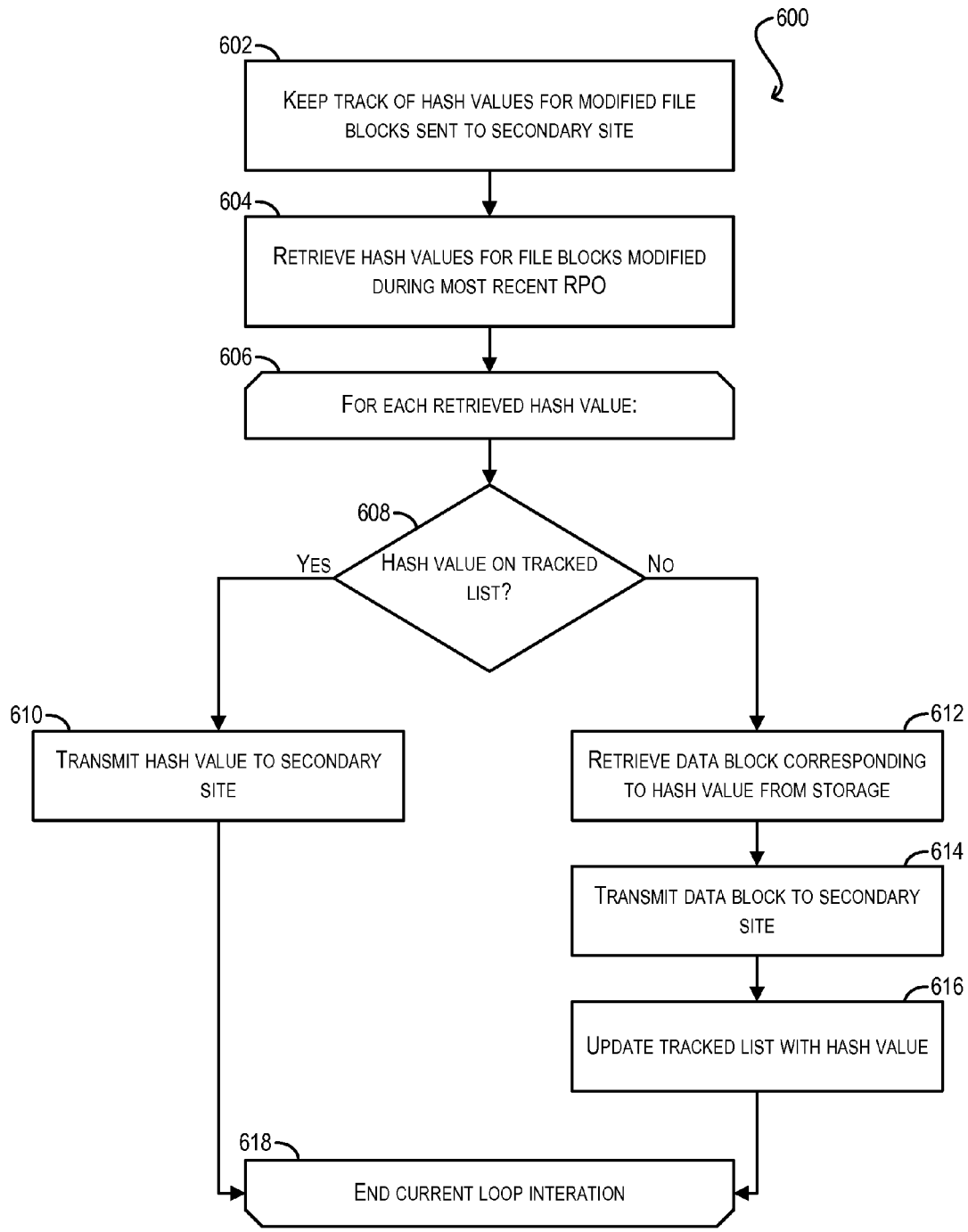
FIGS. 6A and 6B depict flowcharts for more intelligently handling HBR when VMDK data is de-duplicated on disk according to an embodiment.
Figure 6B:
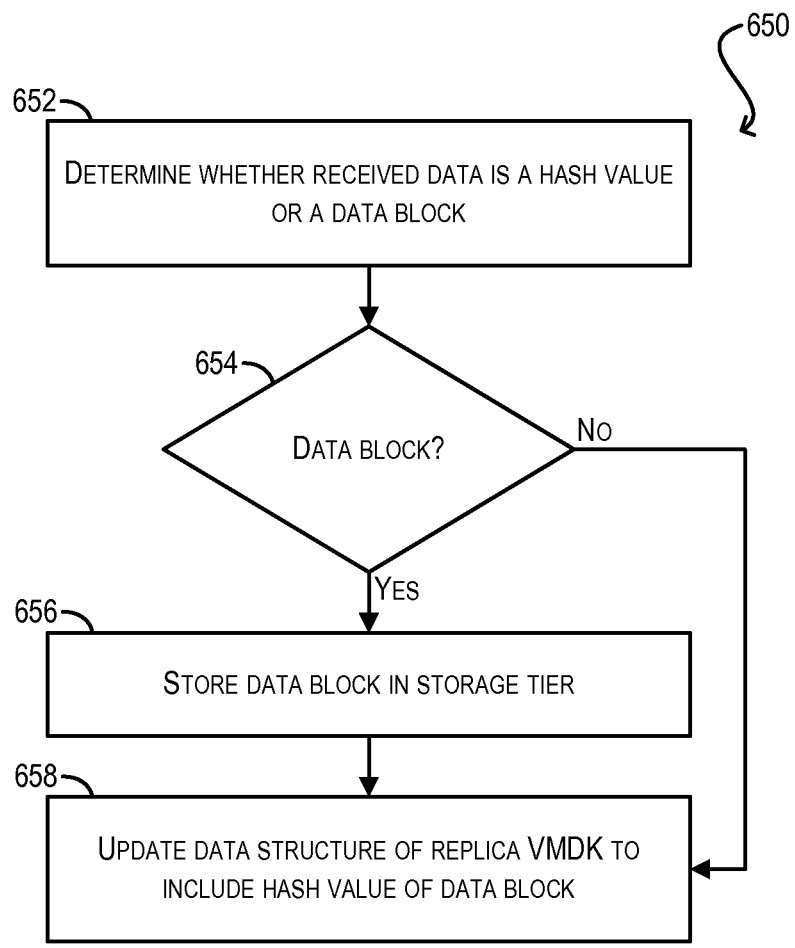

FIGS. 6A and 6B illustrate flowcharts 600 and 650 that can be performed by HBR filter 222 and NFC server 232 respectively for more intelligently handling replication when the VMDK of the VM being replicated (e.g., VMDK 210) is de-duplicated on disk. De-duplication refers to the process of splitting up a data object, such as a VMDK, into data blocks, identifying multiple occurrences of a given data block within a data object or across different data objects, and then storing a single copy of that data block (rather than separate copies for each occurrence) in the storage tier. Each data block has a hash value (e.g., a SHA1 hash) that uniquely identifies the data block and is used to associate the data block with different data objects. Thus, when a VMDK is de-duplicated on disk, it is actually stored as a collection of hash values, which in turn correspond to unique data blocks that make up the disk file (and which may also be part of other disk files).

With flowcharts 600 and 650, HBR filter 222 and NFC server 232 can leverage this de-duplication at the storage layer to minimize the amount of VMDK data that is transferred over the wire between primary site 208 and secondary site 218.

Starting with step 602 of flowchart 600, HBR filter 222 can keep track of hash values for modified file blocks that are sent over to secondary site 218 as part of the HBR workflow.

At the conclusion of an RPO interval, HBR filter 222 can retrieve, from VMDK 210, hash values for the VMDK file blocks that have been modified by I/O writes during the interval (step 604). Note that this is different from step (3) of workflow 300 since HBR filter 222 only retrieves hash values at step 604, rather than the actual VMDK data. Then, at step 606, HBR filter 222 can enter a loop to compare each retrieved hash value with the hash values it has been tracking (per step 602).

For a given hash value, if it is already on the filter's list of tracked values (meaning that the data block corresponding to that hash value has already been sent over to secondary site 218), HBR filter 222 can simply send over the hash value (rather than the data block corresponding to the hash value) over the wire (steps 608 and 610). This is because the data block should already exist in storage tier 216 at secondary site 218, and thus there is no need to send the actual data again.

However, if the hash value is not on the filter's list of tracked values (meaning that the data block corresponding to that hash value has not yet been sent over to secondary site 218), HBR filter 222 can retrieve the actual data block from storage tier 212 and can send over the data block to secondary site 218 (steps 612 and 614). HBR filter 222 can also update its list of tracked hash values to include the current hash value (step 616). Finally, at step 618, HBR filter 222 can reach the end of the current loop iteration and can return to step 606, if necessary, to process additional hash values for the most recent RPO.

Turning now to flowchart 650 of FIG. 6B, at steps 652 and 654, NFC server 232 can determine whether the information received from HBR filter 222 is a hash value (per step 610 of FIG. 6A) or an actual data block (per step 614 of FIG. 6A). If the received information is an actual data block, NFC server 232 can store the data block in storage tier 216 (step 656) and update the hash value data structure for replica VMDK 214 to include the received hash value (step 658), thereby associating that data block with the VMDK.

On the other hand, if the received information is a hash value, the data block corresponding to that hash value will already exist in storage tier 216. As a result, NFC server 232 can skip directly to step 658 (i.e., update the hash value data structure for replica VMDK 214 to include the received hash value).

It should be appreciated that the flowcharts of FIGS. 4A, 4B, 5A, 5B, 6A, and 6B are illustrative and various modifications are possible. For example, although specific sequences of steps are shown, other sequences of steps may be performed in other embodiments. Further, steps described as sequential can be executed in parallel, order of steps can be varied, and steps may be modified, combined, added, or omitted. One of ordinary skill in the art will recognize many variations, modifications, and alternatives.

Certain embodiments described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, VMs are used as an example for the containers and hypervisors as an example for the hardware abstraction layer. Each VM generally includes a guest operating system in which at least one application runs. It should be noted that these embodiments may also apply to other examples of containers, such as containers not including a guest operating system, referred to herein as "OS-less containers" (see, e.g., www.docker-.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for enabling end-to-end compression when performing host-based replication (HBR), the method comprising:

intercepting, by a hypervisor running on a first host system at a primary site, I/O write requests that originate from a virtual machine (VM) configured to be replicated via HBR, the I/O write requests being destined for a virtual disk (VMDK) of the VM;

tracking, by the hypervisor, VMDK file blocks that are modified by the I/O write requests;

retrieving, by the hypervisor from a storage tier at the primary site, hash values corresponding to VMDK file blocks that have been modified during a most recent recovery point objective (RPO) interval;

comparing, by the hypervisor, the retrieved hash values with a list of hash values corresponding to VMDK file blocks already sent to a secondary site;

for each retrieved hash value that is in the list of hash values, transmitting, by the hypervisor, the retrieved hash value to the secondary site without transmitting the VMDK file block corresponding to the retrieved hash value; and for each retrieved hash value that is not in the list of hash values:
- retrieving, by the hypervisor, the VMDK file block corresponding to the retrieved hash value from the storage tier at the primary site;
- compressing, by the hypervisor, the retrieved VMDK file block; and
- transmitting, by the hypervisor, the compressed VMDK file block to the secondary site.

2. The method of claim 1 wherein, upon receiving the compressed VMDK file block, a second host system at the secondary site is configured to:
- identify a third host system at the secondary site that is capable of writing the file block to a replica VMDK stored on a storage tier of the secondary site; and
- forward the compressed VMDK file block via network file copy (NFC) to the third host system.

3. The method of claim 2 wherein a hypervisor running on the third host system is configured to:
- receive the compressed VMDK file block forwarded from the second host system;
- decompress the compressed VMDK file block; and
- write the decompressed VMDK file block to the replica VMDK stored on the storage tier of the secondary site.

4. The method of claim 1 wherein the primary site and the secondary site are connected via a wide area network (WAN).

5. The method of claim 1 wherein, prior to compressing the retrieved VMDK file block, the hypervisor of the first host system is configured to:
- determine whether the VMDK is compressed on disk; and
- if the VMDK is compressed on disk, transmit the retrieved VMDK file block to the secondary site without performing any compression.

6. The method of claim 1 wherein the primary site and the secondary site are connected via an unsecure network connection, and wherein prior to transmitting the compressed VMDK file block to the secondary site, the hypervisor of the first host system is configured to:
- determine whether the VMDK is encrypted on disk;
- if the VMDK is encrypted on disk, transmit the compressed VMDK file block to the secondary site without performing any encryption; and
- if the VMDK is not encrypted on disk:
  - encrypt the compressed VMDK file block; and
  - transmit the encrypted and compressed VMDK file block to the secondary site.

7. A non-transitory computer readable storage medium having stored thereon program code executable by a first host system at a primary site, the program code embodying a method for enabling end-to-end compression when performing host-based replication (HBR), the method comprising:
- intercepting I/O write requests that originate from a virtual machine (VM) configured to be replicated via HBR, the I/O write requests being destined for a virtual disk (VMDK) of the VM;
- tracking VMDK file blocks that are modified by the I/O write requests;
- retrieving, from a storage tier at the primary site, hash values corresponding to VMDK file blocks that have been modified during a most recent recovery point objective (RPO) interval;
- comparing the retrieved hash values with a list of hash values corresponding to VMDK file blocks already sent to a secondary site;
- for each retrieved hash value that is in the list of hash values, transmitting the retrieved hash value to the secondary site without transmitting the VMDK file block corresponding to the retrieved hash value; and
- for each retrieved hash value that is not in the list of hash values:
  - retrieving the VMDK file block corresponding to the retrieved hash value from the storage tier at the primary site;
  - compressing the retrieved VMDK file block; and
  - transmitting the compressed VMDK file block to the secondary site.

8. The non-transitory computer readable storage medium of claim 7 wherein, upon receiving the compressed VMDK file block, a second host system at the secondary site is configured to:
- identify a third host system at the secondary site that is capable of writing the file block to a replica VMDK stored on a storage tier of the secondary site; and
- forward the compressed VMDK file block via network file copy (NFC) to the third host system.

9. The non-transitory computer readable storage medium of claim 8 wherein a hypervisor running on the third host system is configured to:
- receive the compressed VMDK file block forwarded from the second host system;
- decompress the compressed VMDK file block; and
- write the decompressed VMDK file block to the replica VMDK stored on the storage tier of the secondary site.

10. The non-transitory computer readable storage medium of claim 7 wherein the primary site and the secondary site are connected via a wide area network (WAN).

11. The non-transitory computer readable storage medium of claim 7 wherein, prior to compressing the retrieved VMDK file block, the first host system is configured to:
- determine whether the VMDK is compressed on disk; and
- if the VMDK is compressed on disk, transmit the retrieved VMDK file block to the secondary site without performing any compression.

12. The non-transitory computer readable storage medium of claim 7 wherein the primary site and the secondary site are connected via an unsecure network connection, and wherein prior to transmitting the compressed VMDK file block to the secondary site, the first host system is configured to:
- determine whether the VMDK is encrypted on disk;
- if the VMDK is encrypted on disk, transmit the compressed VMDK file block to the secondary site without performing any encryption; and
- if the VMDK is not encrypted on disk:
  - encrypt the compressed VMDK file block; and
  - transmit the encrypted and compressed VMDK file block to the secondary site.

13. A first host system operating at a primary site in a host-based replication (HBR) workflow, the first host system comprising:
- a processor; and
- a hypervisor running on the processor that is configured to:

intercept I/O write requests that originate from a virtual machine (VM) configured to be replicated via HBR, the I/O write requests being destined for a virtual disk (VMDK) of the VM;

track VMDK file blocks that are modified by the I/O write requests;

retrieve, from a storage tier at the primary site, hash values corresponding to VMDK file blocks that have been modified during a most recent recovery point objective (RPO) interval;

compare the retrieved hash values with a list of hash values corresponding to VMDK file blocks already sent to a secondary site;

for each retrieved hash value that is in the list of hash values, transmit the retrieved hash value to the secondary site without transmitting the VMDK file block corresponding to the retrieved hash value; and for each retrieved hash value that is not in the list of hash values:
retrieve the VMDK file block corresponding to the retrieved hash value from the storage tier at the primary site;
compress the retrieved VMDK file block; and
transmit the compressed VMDK file block to the secondary site.

14. The first host system of claim 13 wherein, upon receiving the compressed VMDK file block, a second host system at the secondary site is configured to:
identify a third host system at the secondary site that is capable of writing the file block to a replica VMDK stored on a storage tier of the secondary site; and
forward the compressed VMDK file block via network file copy (NFC) to the third host system.

15. The first host system of claim 14 wherein a hypervisor running on the third host system is configured to:
receive the compressed VMDK file block forwarded from the second host system;
decompress the compressed VMDK file block; and
write the decompressed VMDK file block to the replica VMDK stored on the storage tier of the secondary site.

16. The first host system of claim 13 wherein the primary site and the secondary site are connected via a wide area network (WAN).

17. The first host system of claim 13 wherein, prior to compressing the retrieved VMDK file block, the hypervisor of the first host system is configured to:
determine whether the VMDK is compressed on disk; and
if the VMDK is compressed on disk, transmit the retrieved VMDK file block to the secondary site without performing any compression.

18. The first host system of claim 13 wherein the primary site and the secondary site are connected via an unsecure network connection, and wherein prior to transmitting the compressed VMDK file block to the secondary site, the hypervisor of the first host system is configured to:
determine whether the VMDK is encrypted on disk;
if the VMDK is encrypted on disk, transmit the compressed VMDK file block to the secondary site without performing any encryption; and
if the VMDK is not encrypted on disk:
encrypt the compressed VMDK file block; and
transmit the encrypted and compressed VMDK file block to the secondary site.

* * * * *